United States Patent
Gamble

(10) Patent No.: US 11,532,017 B2
(45) Date of Patent: Dec. 20, 2022

(54) METHOD AND SYSTEM FOR INTERACTIVE NOTATION AND TEXT DATA STORAGE WITH A MOBILE DEVICE

(71) Applicant: Oliver Wendel Gamble, New York, NY (US)

(72) Inventor: Oliver Wendel Gamble, New York, NY (US)

( * ) Notice: Subject to any disclaimer, the term of this patent is extended or adjusted under 35 U.S.C. 154(b) by 1958 days.

(21) Appl. No.: 14/541,132

(22) Filed: Nov. 13, 2014

(65) Prior Publication Data

US 2015/0205861 A1 Jul. 23, 2015

Related U.S. Application Data

(60) Provisional application No. 61/962,697, filed on Nov. 13, 2013.

(51) Int. Cl.
*H04W 4/12* (2009.01)
*G06Q 30/02* (2012.01)

(52) U.S. Cl.
CPC .......... *G06Q 30/0267* (2013.01); *H04W 4/12* (2013.01)

(58) Field of Classification Search
CPC ............ H04W 4/12; H04W 4/14; H04W 4/16
USPC .................. 455/412.1, 412.2, 466, 566, 567
See application file for complete search history.

(56) References Cited

U.S. PATENT DOCUMENTS

| | | | |
|---|---|---|---|
| 7,768,364 B2* | 8/2010 | Hart | H03H 9/02149 310/364 |
| 9,020,116 B2* | 4/2015 | Rondeau | H04M 3/436 379/197 |
| 2001/0028709 A1* | 10/2001 | Makela | H04M 1/6505 379/214.01 |
| 2005/0094777 A1* | 5/2005 | McClelland | H04M 3/42391 379/52 |
| 2010/0227631 A1* | 9/2010 | Bolton | H04L 12/587 455/466 |
| 2011/0093949 A1* | 4/2011 | Macrae | G06F 17/30864 726/19 |
| 2012/0079037 A1* | 3/2012 | Rajguru | H04L 51/38 709/206 |
| 2015/0017953 A1* | 1/2015 | Swink | H04L 51/32 455/412.2 |
| 2015/0382161 A1* | 12/2015 | Ford | H04M 1/72547 455/466 |

* cited by examiner

*Primary Examiner* — Jean A Gelin

(57) ABSTRACT

A messaging system and methods that can be simultaneously employed during a voice conversation, ensuring not all information conveyed to the called party can be overheard. Eliminating the need for callers to switch between calling and text to send detail information that needs to be written down. Text messages storage of in a searchable database format as opposed to a running series of sequential messages, enabling both security and quick access to information when needed. Interactivity that will allow text messages to response to date/times to determine a course of action such as alarm notification of upcoming deadlines or being able to automatically eliminate old and outdated messages.

18 Claims, 14 Drawing Sheets

Figure 5

| Name | Phone | Search Key | Data 1 | Data 2 | Data 3 |
|---|---|---|---|---|---|
| Dr. Jack Raymorey | 314-446-7892 | Doctor | 371 E 26th Street | 9 – 5 M-F | 10 – 4 Sat |
| Bus Company | 201-555-0897 | Schedule | Fairport, NY | Gate # 12  8:30 p | Gate # 17  9:15 p |

Table containing two (2) records of data capture by CODA-II.

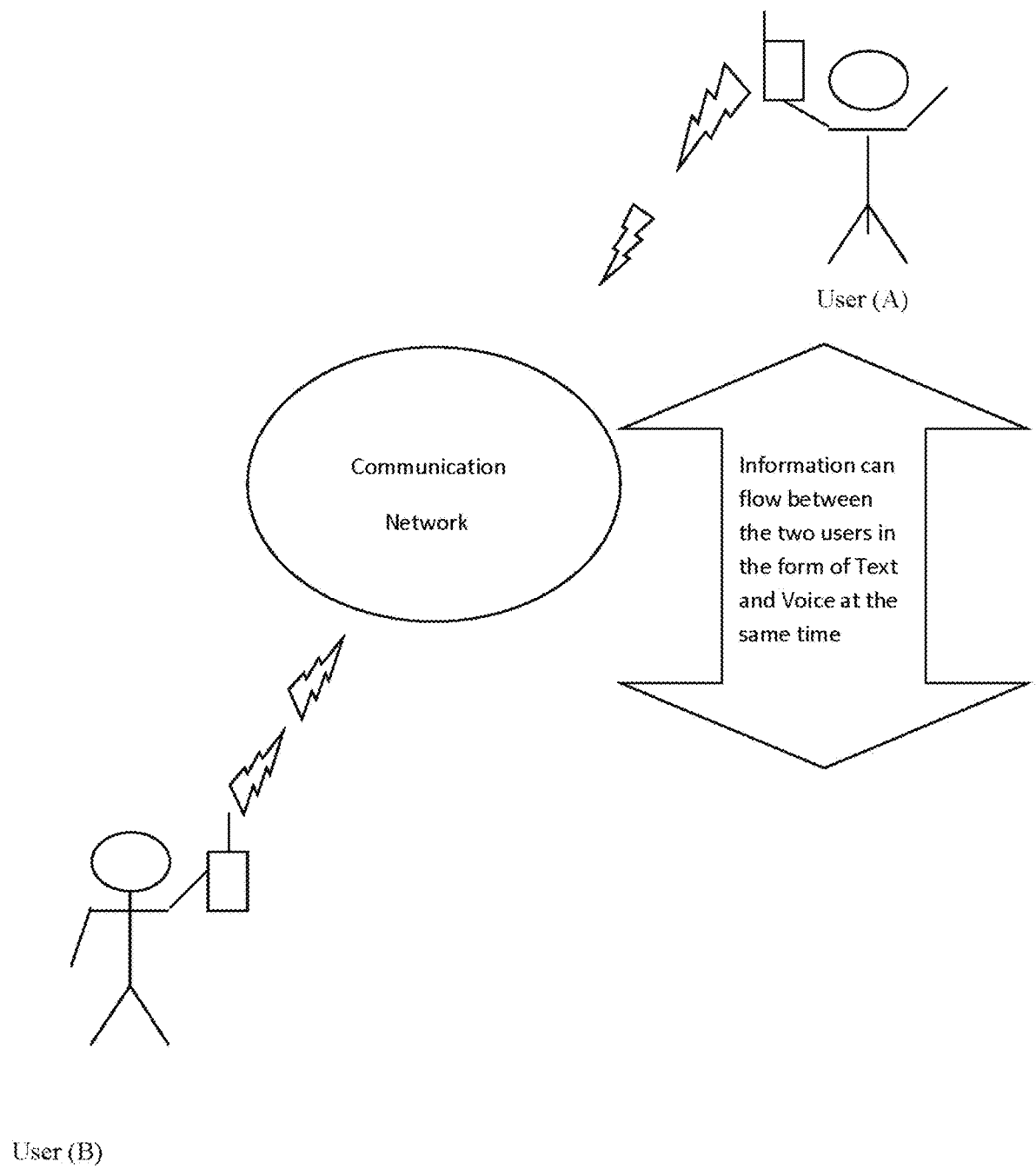

Figure 8

| Fields Of Table | Comments | More Detail About Table |
|---|---|---|
| 0 Communication Type | Ad or Non-Ad | Ad or Non Ad communication |
| 1 Remove Ads | Flag to remove Ad on date | Date on which Ad is remove |
| 2 Remove Non-Ad | Flag to remove Non_Ad on Date | Date on which Non-Ad is removed |
| 3 Search Key | Search Key for Retrieving Text Mess | Search Key |
| 4 Created Date | Day, Hours | When Message Arrived |
| 5 Base_01 | Name | Text 40 char |
| 6 Base_02 | Address | Text 40 char |
| 7 Base_03 | Phone | Text 10 char |
| 8 Base_04 | Email | Text 40 char |
| 9 Base_05 | Source of Data | Text 40 char |
| 10 Data_01 | Additional Data Storage Capacity* | Text 40 char |
| 11 Data_02 | Additional Data Storage Capacity | Text 40 char |
| 12 Data_03 | Additional Data Storage Capacity | Text 40 char |
| 13 Data_04 | Additional Data Storage Capacity | Text 40 char |
| 14 Data_05 | Additional Data Storage Capacity | Text 40 char |
| 15 Data_06 | Additional Data Storage Capacity | Text 40 char |
| 16 Data_07 | Additional Data Storage Capacity | Text 40 char |
| 17 Data_08 | Additional Data Storage Capacity | Text 40 char |
| 18 Data_09 | Additional Data Storage Capacity | Text 40 char |
| 19 Data_10 | Additional Data Storage Capacity | Text 40 char |
| 20 Action_Trig1 | Alarm - Date Time | Date_Time |
| 21 Action_Trig2 | Alarm - Date Time | Date_Time |
| * Each Additional Data Storage field Has An Origin Indication | | |

Figure 9

| | |
|---|---|
| 1 | 08252014 |
| 2 | Friends |
| 3 | |
| 4 | 08232014 |
| 5 | John |
| 6 | 201 Park Way Drive |
| 7 | 215-234-4221 |
| 8 | www.john.Peterson29.com |
| 10 | 4221: Ready for tomorrows TGIF diner... |
| 11 | You: Yes |
| 12 | 4221: bring that redhead |
| 13 | You: No, broke up |
| 14 | 4221: Can I have her number |
| 15 | You: No, bring your sister |
| 16 | 4221: AO! |
| 17 | You: Bye |
| 20 | |

As lines of text is exchange the fields of the record are filled up. When all of the fields in the Record is filled, the record is saved. Being that the record has a set number of fields the user can gage the amout of memory left to each session.

METHOD AND SYSTEM FOR INTERACTIVE NOTATION AND TEXT DATA STORAGE WITH A MOBILE DEVICE

The present application claims the benefit of priority of Provisional Patent Application Ser. No. 61/962,697 entitled "Method And System For Interactive Notation on a Mobile Device," filed on Nov. 13, 2013, the disclosure of which is hereby incorporated by reference in its entirety for all purposes.

Before the present methods and systems are disclosed and described in this patent, it is to be understood that the methods and systems are not limited to specific methods, specific components, or to particular implementations. It is also to be understood that the terminology used herein is for the purpose of describing particular embodiments only and is not intended to be limiting to the scope of the patent.

FIELD OF THE INVENTION

The present invention relates generally to a method and system for improving the utilization of information obtainable from the utilization text messaging in general and of CODA (Callers, Operators, or Directory Assistance: U.S. Pat. No. 7,027,580) specifically. Traditional texting service is limited in functionality. The current texting systems consist of communications being viewed and stored in a fixed sequential order on any device capable of sending or receiving texted information. Deleting a text message or locking ones phone is the only way to safeguard sensitive information. Housekeeping of texted information is a time consuming task: generally, the user waits until their phone memory is full before screening saved text-message for deletion. Current text messaging does offer some functionality: email links and dialing of enclosed phone numbers. CODA-II is a more robust communications system; it offers Interactive Relational Text-Messaging functionality (I.R.T.). CODA-II will allow simultaneous voice and text messaging at the same time. CODA-II will allow separate the text component and store it in fields of a record. The record can then be treated as an individual item that can be manipulated. The database containing the record can be stored on the phone or in the cloud. CODA-II ability to use the cloud to store and retrieve information will give text messages database type functions. This is something that will revolutionize the text-messaging universe.

BACKGROUND OF THE INVENTION

It so often happens that you cannot find a pen or pencil when you are getting a phone number, an address from someone, or some needed information during a telephone call to another Caller, an Operator, or Directory Assistance. Trying to remember a string of unrelated spoken numbers or words can be difficult at the best of times, and a task when under pressure; from being in a rush, or in a noisy crowded public place. This can cost both time and money if the information is incorrectly captured and used, or if correct information is not used at all. Sometime you collect meeting information but forget to use it. Stored information on a cell phone in the form of a text message can be hard to locate if it came from someone that frequently send text messages on daily basis. CODA-II will enable enhance utilization of information capture over a communication network.

Currently, the best Directory Assistance systems will provide the address and phone number information in text format, and then dial it for the caller. Most telephone users would prefer a system that allows them to quickly and easily obtain a desired phone number, review that phone number, be able to dial the number when they want, and be able to retrieve that phone number at a later date if needed without incurring additional cost.

CODA-II will enable mobile device users communicate and pass sensitive information in crowded locations without fear of being overheard. They will be able to hear and gage the caller's intent and emotional state, to be reminded of deadline and appointments without having to set alarm, to have secured text message on their phone and in storage without fear of it being viewed by anyone with access to their phone, allow users to quickly search their text messages. These are just a few of the increase functionality CODA-II will bring to mobile devices.

SUMMARY OF THE INVENTION

Accordingly, an improved system and method are required which will allow a telephone user to better access and use information obtained over a communication network. , while avoiding lengthy search for specifics, elimination of transcription errors, extra service charges or the risk of dialing a wrong number. The method and system of CODA-II solves these problems. According to the preferred embodiment, CODA-II enables the user to electronically capture and store information transmitted to the user's phone in records stored in a searchable file. Each record contains information transmitted to the cell phone via to the CODA-II system, under an editable search key. The editable search key allows the phone user to store the information under a word that best suits the information they are storing on their phone. Once the information is stored under a word that best describes it to the user, the user will be able to easily search and retrieve for it at a future date. By adding an editable search key and enhance data storage to CODA-II, the user will be able to rapidly capture data and catalog it in a manner that will allow them to retrieve for future utilization. In the preferred embodiment of CODA-II, the user can use the CODA-II application to send information from their cell phone to another cell phone that has the CODA-II application installed on it. This is what is referred to as "Callers, in CODA-II-Caller, Operator, and Directory Assistance".

Preferred Embodiment of The Invention

During the initial installation of the CODA-II application, the user indicates their communication type from a selection of options in the setup. If the phone user is an individuals and the phone will be used to call friends, family, and whatever else they choose they will select the "Non Ad-Related" option. If the caller phone belongs to a company that deals with customers, vendor, and business related individuals they will select "Ad-Related. This selection will become their "Communication Type". Each message created by a CODA-II application will contain a Communication Type and certain Identifying basic information such as Name, Phone and possibly address, email. The latter two items may be optional, as a user may not want to give out their address/email, but a company would (FIG. 3 and FIG. 4). The CODA-II application on the message-receiving phone will use the Communication Type to determine how messages will be treated.

The information capture by the CODA-II application will be displayed according to a predetermined formatted for optimum use and viewing: i.e. name, phone number, address, web-link or email, any message text, and the editable search key (FIG. 3). The information may arrive with the search key being set to "Information". The phone owner can key edit the search key to "Family" if the information contain phone and address of a relative. This will allow the user in the future to be able to retrieve the information not only by name, but also by searching under Family".

In the preferred embodiment of CODA-II, directory assistance (DA) information relating to a doctor's office is transmitted to a phone. This communication type is "Ad-Related" because the information is related to a professional setting. The information capture by the CODA-II application on the phone is formatted in a manner that displays of the doctor's name, phone number, office hours, and an editable search key (see FIG. 3). The information may arrive with the search key being set to "Information". The user can edit the search key to say "Doctor" (see FIG. 5).

The innovation of an editable search key will allow the user to see all of the phone numbers in the phone that relate to relatives. If the user does not see the phone number that they are seeking (i.e. their Uncle Sam), they may see another relative (i.e. cousin FICA) who does have the desired phone number (Uncle Sam phone number). The utilization of a searchable database format to store information will improve what can be done with information capture/transmitted over a communication network. Each saved communication is known as a "Communication Session", and each session can contain up to 10 lines of texts. The ability to isolate individual communication sessions will enable specific functionalities to be added to any of the saved communication sessions. Instead of retrieving information by strolling through a string of communication sessions that are annotated only by date, CODA-II will provide searchable keyword in addition to date. CODA-II users can store information in categories on their cell phone, or under unique code that can be searched and quickly retrieved. This will be a major improvement in how people store and use text messages on current phones. This will enable the user to have an open/unlock phone and be able to protect/hide sensitive text messages. If the message is tagged as sensitive, then it can only be retrieved by a specific user specified search key.

The preferred embodiment of the CODA-II application can utilize the built-in clock/calendar of the phone. When the user gets information (gate and departure times) from a bus station CODA enable information system, a component of that information can be an alert time flag that will enable the CODA-II application to beep when it gets within 2 hours of departure. This functionality would serve as a reminder to the user of their interest in the catching a bus to a destination (see FIG. 4). CODA-II, is designed to be interactive with the phone with regards to data it captures, able to dial capture phone number and detect various flags and indicators. The time/Clock linkage can also be used to trigger self-erasure of communication. A message can be send to a user with a self-erasure "time date flag" in it, prompting CODA-II to remove the message after a set time period. This would allow CODA_II to remove old/outdated ads and services being offered by store and companies to consumers. The CODA-II capture information is stored in a searchable data base file on the phone along with the CODA-II software application.

In An Alternative Embodiment

In an alternate embodiment, the ad/message erasure/removal can be partial, that is some of the original message is retained, and anything that is time sensitive (expire with time) can be removed. When a sale ends, CODA-II could retain the basic information (aka base information) the store name, phone number, address, and web-link, but rid the phone of the outdated sales material (see FIG. 6). CODA-II breaks up the data that it transmits and capture into two categories: "base information" and "additional data storage capacity" (see FIG. 8, FIG. 9, and FIG. 10).

In an alternate embodiment, capture information can be stored in the cloud (remote computer processing center and data storage). When information is capture by the CODA-II application, the application loads the information into a data base record. That record can be stored in a table on a cloud server, with each record having a keyword that can be used to retrieve it. The stored record can be retrieved by doing a keyword search. The search will return all records with that key word. If someone were to search a CODA-II application by keyword and did not have the exact keyword that a record was stored under, they would not be able to record that record. Keyword can be family, doctor, Mike, store, sales, or 142isSoxR. By entering the keyword in the search, you will get only those records that share that same keyword.

In an alternative embodiment of the cloud version of the CODA-II application, the storage process can involve the download of advertising. The advertising can be text, audio, graphic or some combination of the three will be display on the screen as the user starts to use the application. In this embodiment, when the user first sets up their cloud account, they will be able to indicate what types of ads they are interested in from a selection offered. This will encourage the user to pay more attention to the ads displayed, and allow the advertisers to know that there is some interest in the product by the user.

DESCRIPTION OF FIGURES

FIG. 5 illustrates the data file in the CODA-II enabled phone, that contains the captured and store information. There is the name, phone number, (editable) search key, and data fields.

FIG. 6 (A) show the screen when information is first captured, and FIG. 6 (B) shows the screen after the information become obsolete: time and gate information is deleted. Only the base information remains: Company Name, Phone Number, and Search Key. This will save on storage used by the CODA-II application.

FIG. 7 illustrates CODA-II phone application in the Caller (Coda-ii) mode. In the Caller mode, the application allows two users (user "A" and user "B") to communicate with one another via text messages while a call is in progress. This feature has many advantages such as allowing annotation to conversations, clarification of what is being said, and privacy. CODA-II will allow a user to annotation a message in public without letting anyone know what is being express to the other person (i.e. "Yes, he is working on it now and it will be ready by Friday: Annotation:: In a pig's eye::). CODA-II can clarify information being conveyed from one phone user to another, by the user actually typing out the information:: 33 of item 3, and 1 of item 21::. There will be not confusion about what was said, because a written copy can be forwarded along with the verbal communication. CODA-II can get a user privacy in a crowed place, allowing the user to issue instruction in test or words, and the ability to text sensitive information while talking: i.e. "John go to my computer and open the Denton file:: password "humdinger#77"::. Typing out the password rather than saying it would ensure anyone near-by would not be able to overhear it.

FIGS. 8-10 illustrates one embodiment of a database that the CODA-II application could use to manage information/data.

FIG. 8 illustrate the fields contained in each record. Each record can be one of two types, either Ad related or Non-Ad. This determination is illustrated in field 0 (communication type). If a record is Ad relate and there is a date in field 1, then the record will be removed from memory on the indicated date indicate in field 1. If a record is Non-Ad relate and there is a date in field 2, then the record will be removed from memory on the indicated date in field 2. The fields of a Non-Ad relate record are filled one at a time according to what is provided in a communication session. A communication session consists of an exchange of information via text during a phone call (see FIG. 10). Each line of text in the exchange is stored in a field. There are 10 text fields in the record in this embodiment. As the fields are filled up, the count is indicate at the bottom of the screen (2:10—denoting 2 of the 10 fields are filled). This allow users to now when they are about to max out a communication session.

FIG. 9 illustrates the fields of the record populated with data of which field 2 contains the Remove Non Ad data flag. When there is a date is in this field, CODA-II application will know to remove the record from memory if the record is typed as a Non-Ad. and the capacity data will be which a table is used to capture and store data/instructions on how the data will be treated. The table is composed of records, and each record represents a text session between a Caller, Operator, and Directory Assistant. In FIG. 8, there are 3 types of data, control data, base data, and capacity data. The control data in each record will determine how the data in that record will be used. Hide, Search_key, Remove_On, and Created_Date are all control fields. Hide is a logic field that will allow the user to hide the entire record. Remove_On and Created_Date are user to trigger the removal of obsolete data/messages, and to trigger alarms when event is approaching. The base data is information that is considered of value independent of time: Name, address, email, and phone number. The "Additional Data Storage Capacity" fields will hold data/information that maybe is time sensitive. If there is a removal data in the record, the information in the "Additional Data Storage Capacity" fields will be removed on the indicated time and date.

FIG. 10 illustrates the progression of a texted conversation between two persons using CODA-II. When a CODA-II communication session first starts, the CODA-II application will automatically transmit and capture base information from the calling parties: Name, Phone, Address, email. As the conversation progresses the fields of the record populated with exchanged information/text communication. The start of each line of text communication has an origin indicator, indication who the information belongs to. The information entered by the phone user will display the word "User" at the beginning of the text. The information entered by the caller will display the last 4 digits of the caller (other party) phone number. 1

Figure 1:
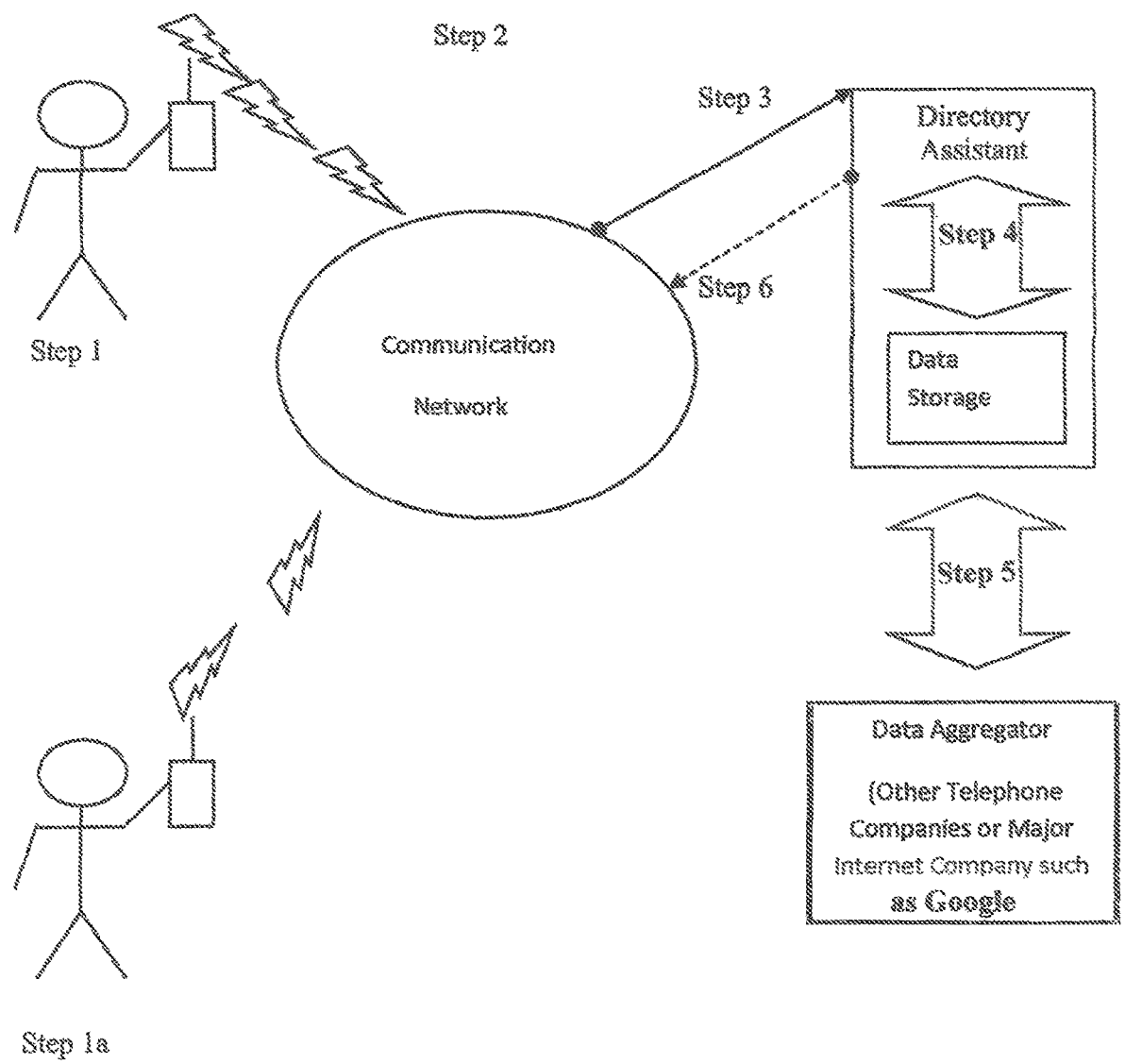
In FIG. 1, there is a user (Step 1) contacting a directory assistance (DA) center that is CODA-II enabled (Step 3) via a communication network (Step 2). The directory assistance recognized the incoming call as coming from a CODA-II enable phone: a phone able to employ high-speed capture of the information that is about to be requested. The user's phone is able to direct its user's inquiry to a directory assistance center that is CODA-II enabled in transmitting requested information. The CODA-II center enabled DA stores information gathered from one or more sources (data aggregators), and uses that stored data to answer callers (users) inquiries. The CODA-II center computer's is able to locate and retrieve the sought data in a format that is defined by the CODA-II system, and transmitted as electronic signals to the user's phone. Step 1a is another user that is also using a wireless device to contact a CODA-II enable Directory Assistance center.
Figure 2:
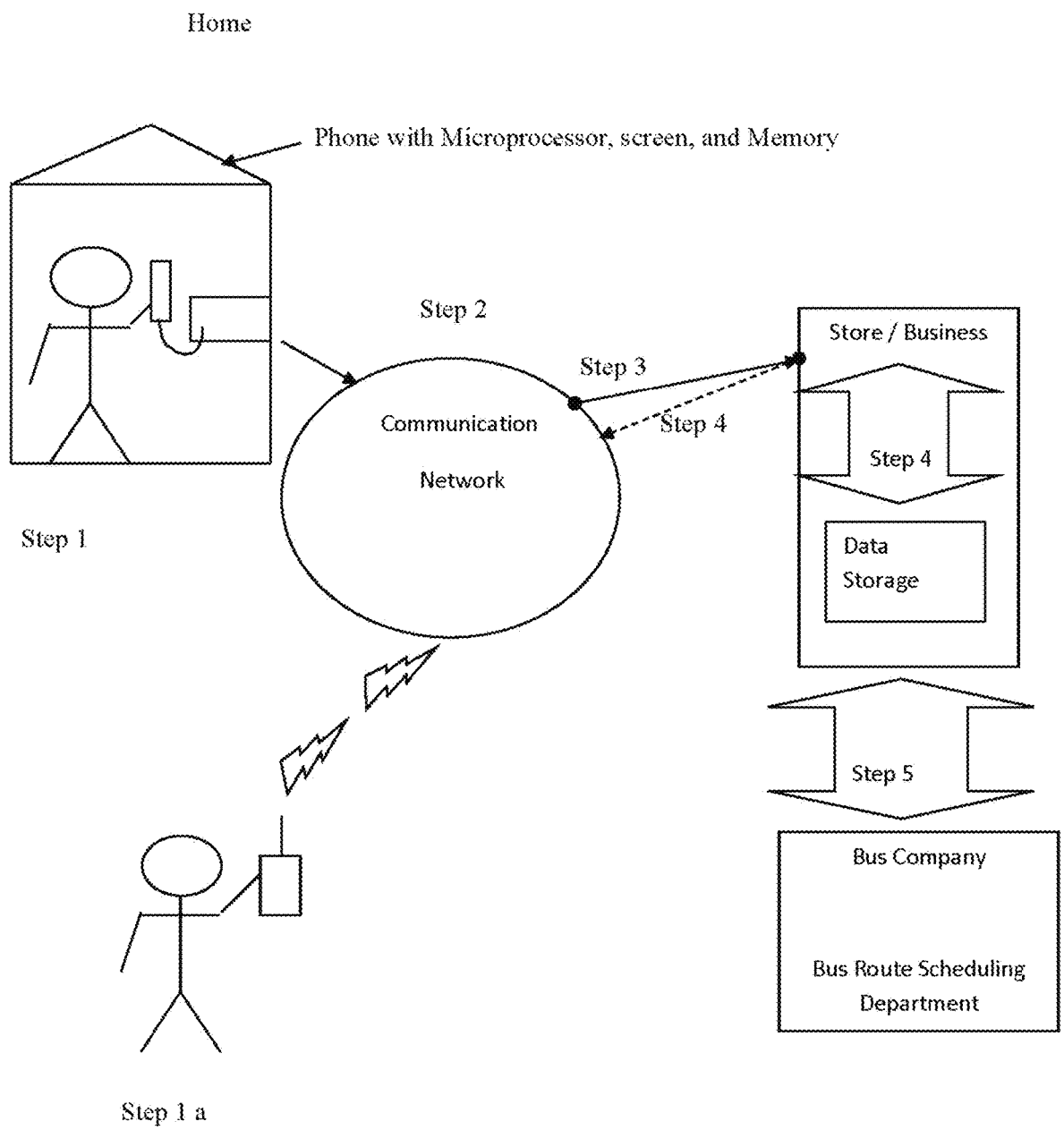
In FIG. 2, there is a user (Step 1a) contacting a Business (Bus Company) call center that is CODA-II enabled (Step 3) via a communication network (Step 2). The bus company's call center recognized the incoming call as coming from a CODA-II enable phone: a phone able to employ high-speed capture of the information that is about to be requested. The user's phone is able to notify the bus company's call center of it CODA-II enabled ability: able to capture high-speed transmitted information. The user/caller asked the call center for a schedule of buses traveling to a given location: Fairport NY. The call center is able to query its database of bus schedule to retrieve requested information and transmit it to the caller using CODA-II information transmission format. The schedule data is created by the bus company's bus scheduling department. Step 1 shows a caller using a landline phone that is CODA-II enabled: possessing memory, microprocessor, CODA-II application, and a display screen.
Figure 3:
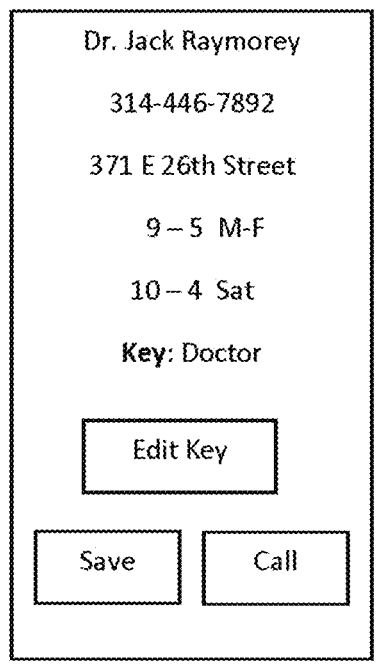
FIG. 3 illustrates what the CODA-II phone screen displaying capturer information on a doctor; from the doctors own phone system, or a referral system. There is the doctor's name, phone number (that can be auto dialed by CODA-II), the office address, and office hours. The screen also displays options available: edit the search key that the information is going to be stored under, save the information without calling, calling the doctor.
Figure 4:
FIG. 4 illustrates what the CODA-II phone screen displaying capturer bus/train schedule information could look like. There is the bus company name, phone number (that can be auto dialed by CODA-II), the destination of the bus/train, departure gate and time. The bus company can provide the next two schedule buses schedule for the desire destination, encase the call is late and misses the first one. The CODA-II is interactive, so it can also be programmed to alert the caller (possibly several hours) ahead of time to remind them of their bus departure time. The screen also displays options available: edit the search key that the information is going to be stored under, save the information without calling, calling the company. The bus/Train information can also include the arrival time as well as the departure.
Figure 6:
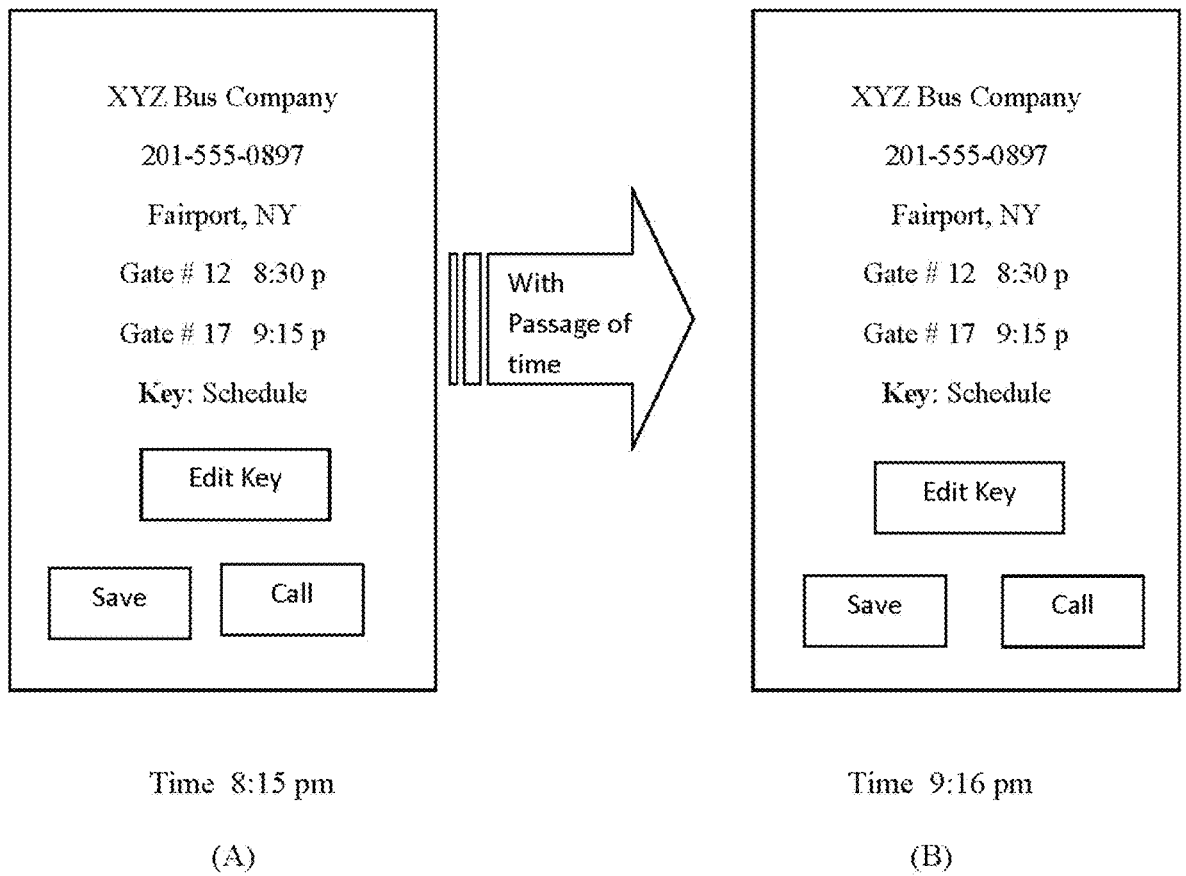
FIG. 6 illustrates what the CODA-II phone screen displaying capturer bus schedule information could look like. There is the bus company name, phone number (that can be auto dialed by CODA-II), the destination of the bus, departure gate and time. The bus company can provide the next two schedule buses schedule for the desire destination, encase the call is late and misses the first one. The CODA-II is interactive, so it can also be programmed to delete obsolete departure times.
Figure 10:
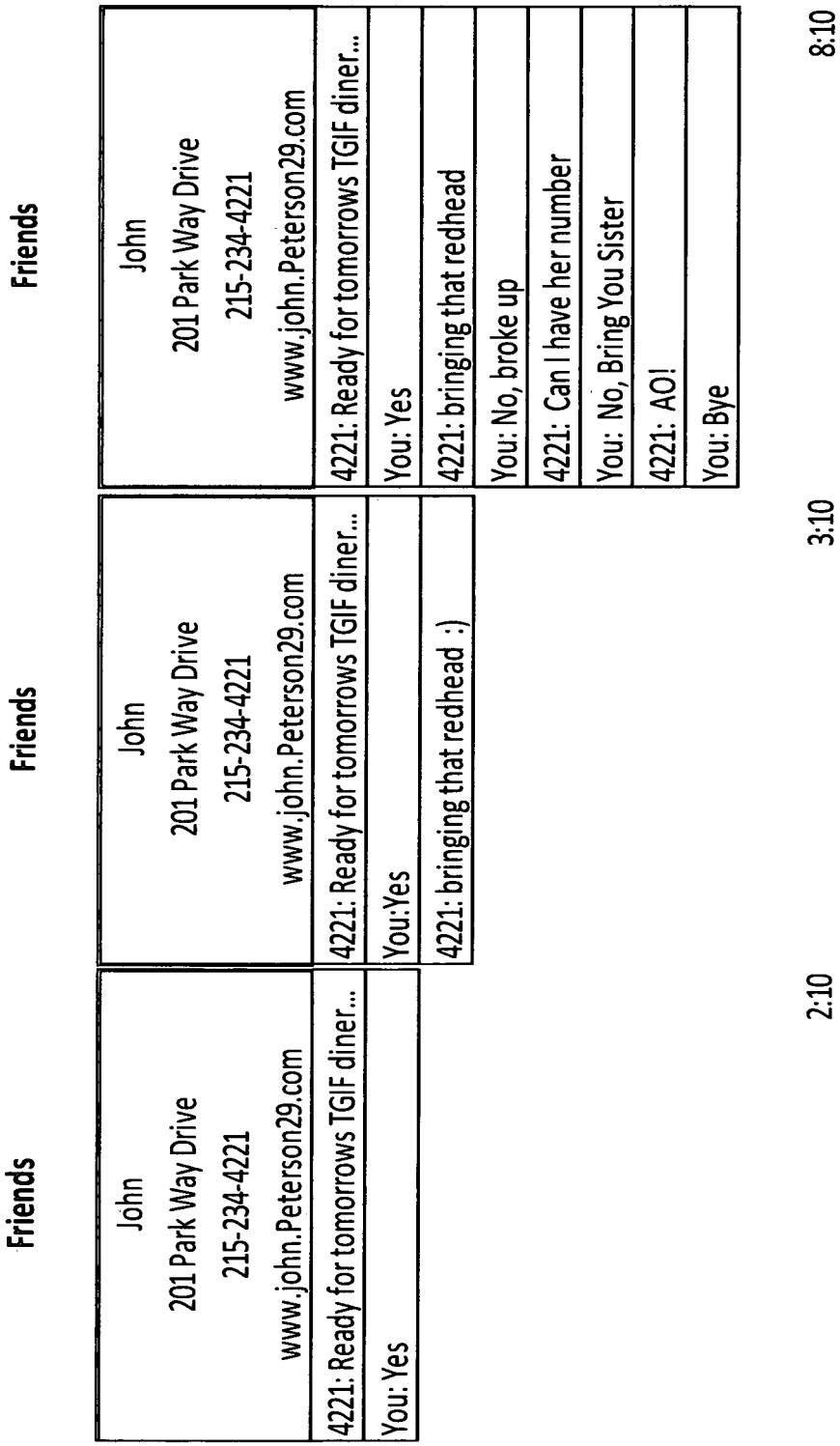
Figure 11A:
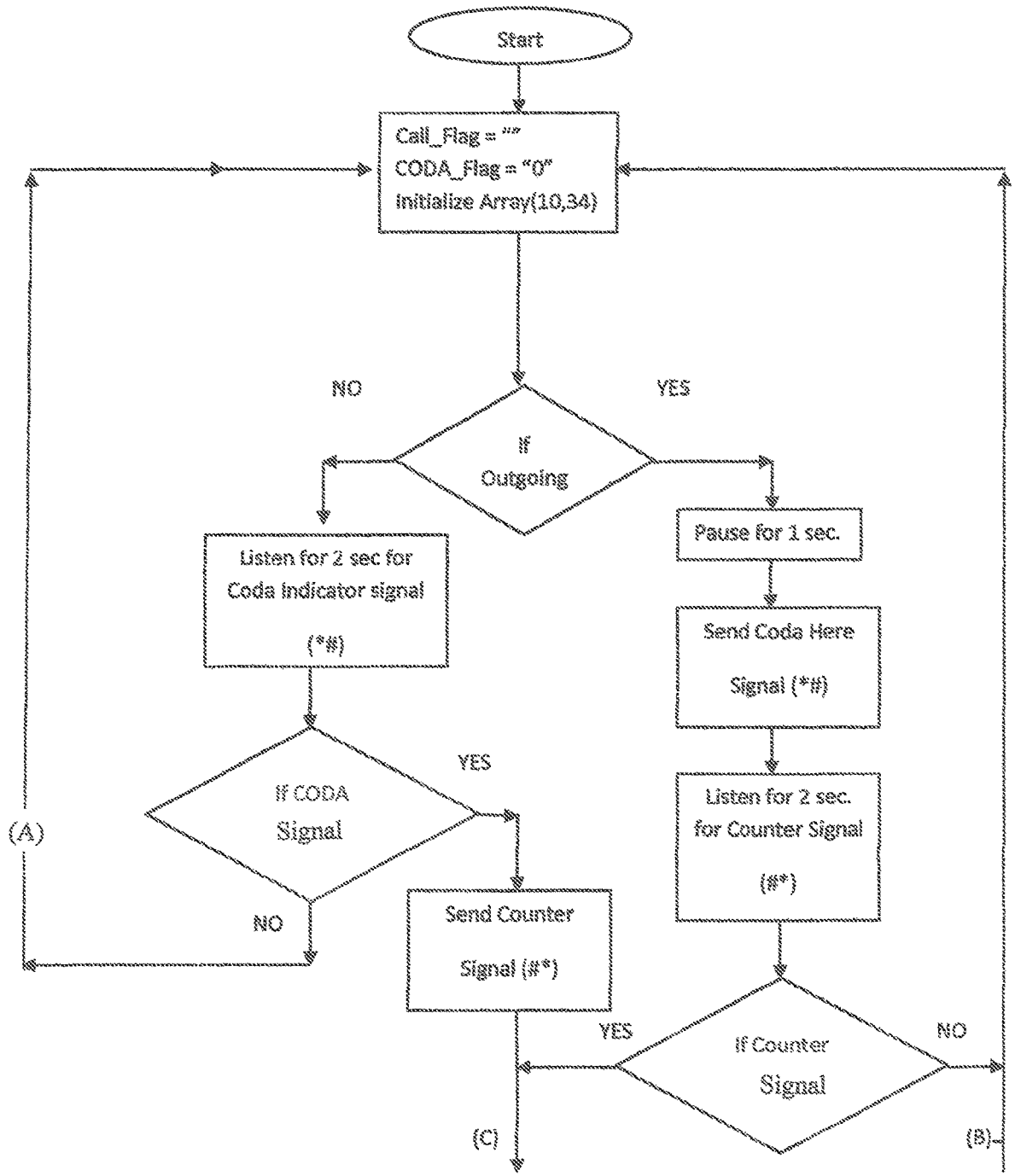
FIG. 11A, FIG. 11B, FIG. 11C, and FIG. 11D illustrates a flowchart of one embodiment of the CODA-II application While the disclosure in this patent are specific they are examples of the preferred embodiments, those skilled in the art will appreciate that there are numerous variations and permutations of the above described systems and techniques that fall within the spirit and scope as set in the appended claims.
Figure 11B:
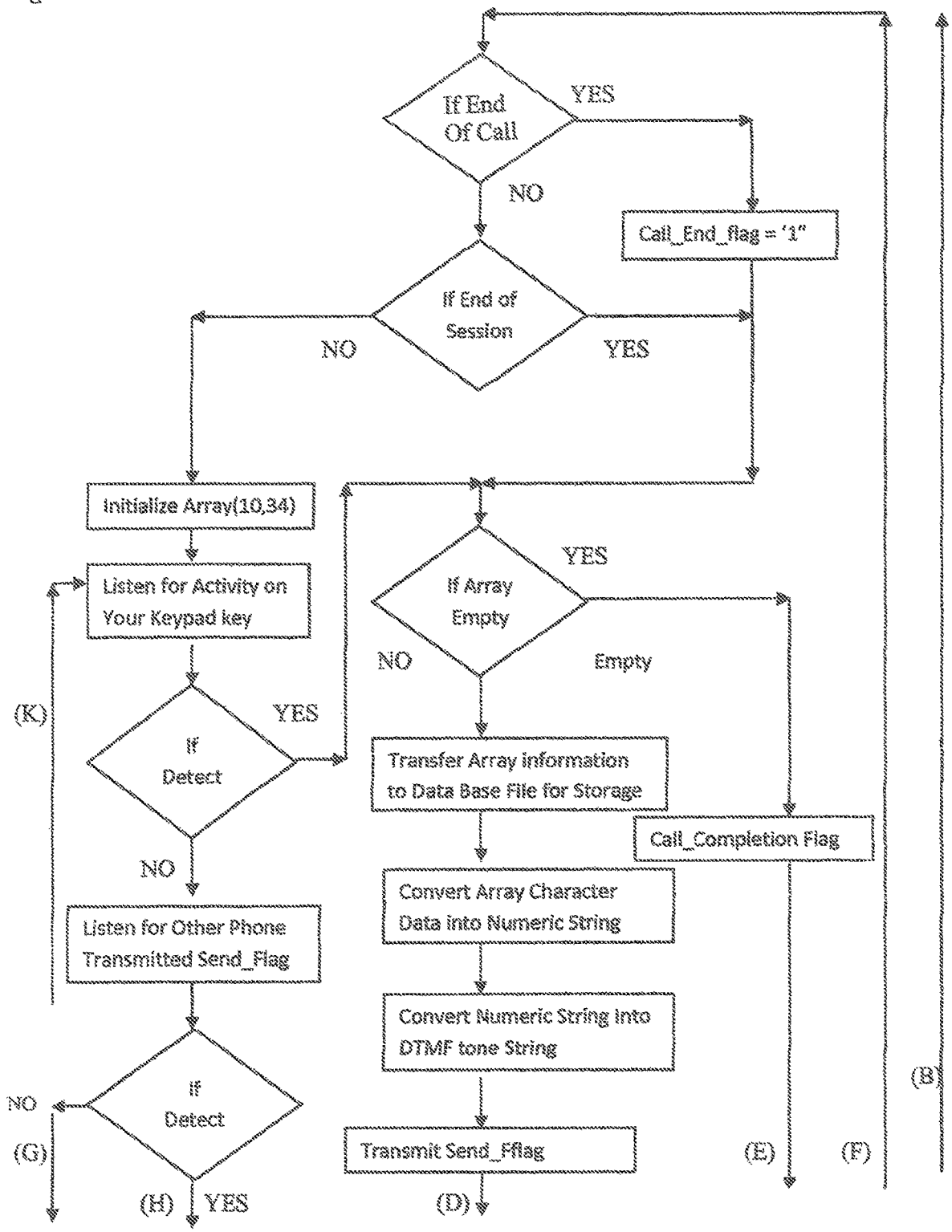
Figure 11C:
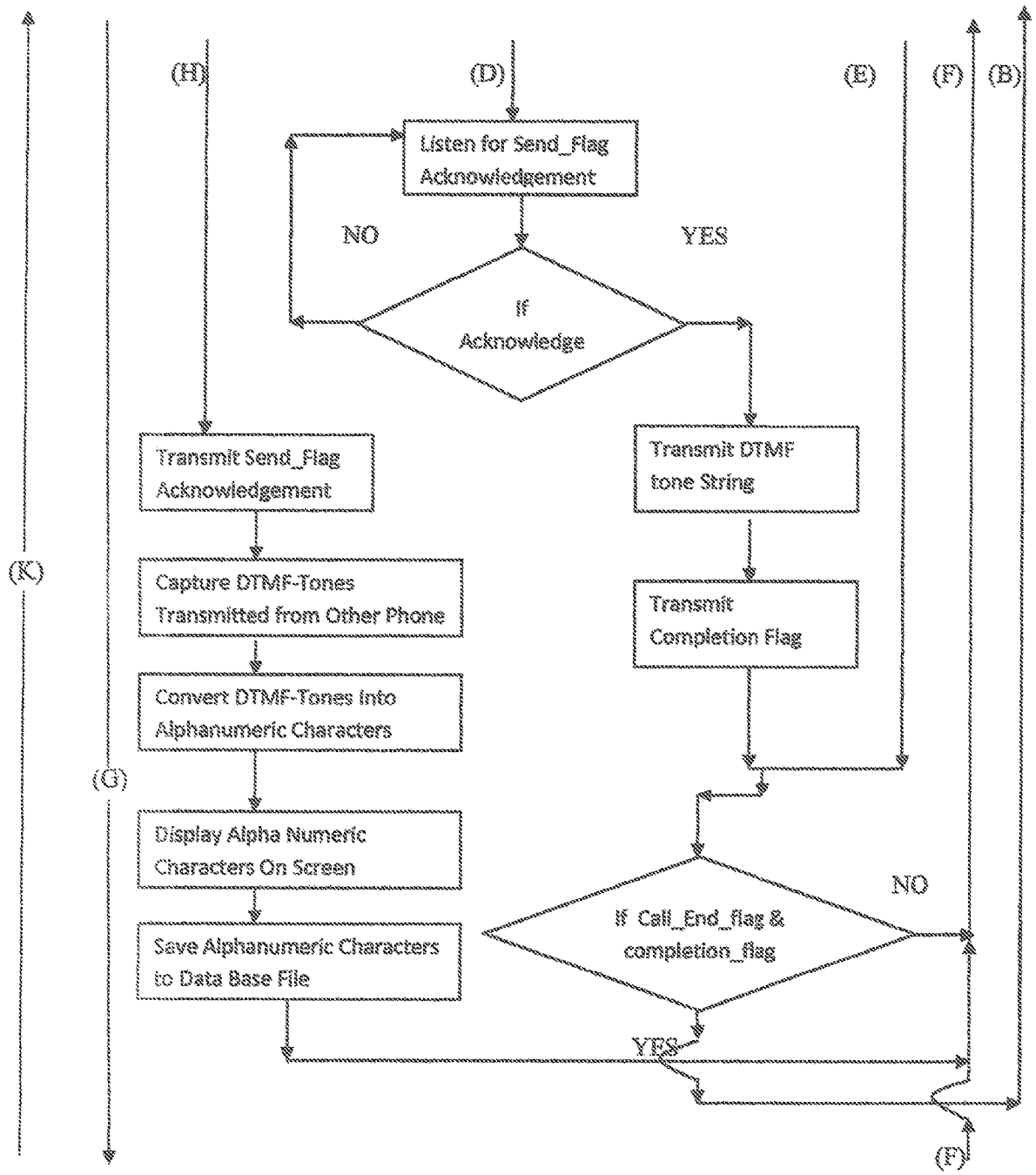
Figure 11D:
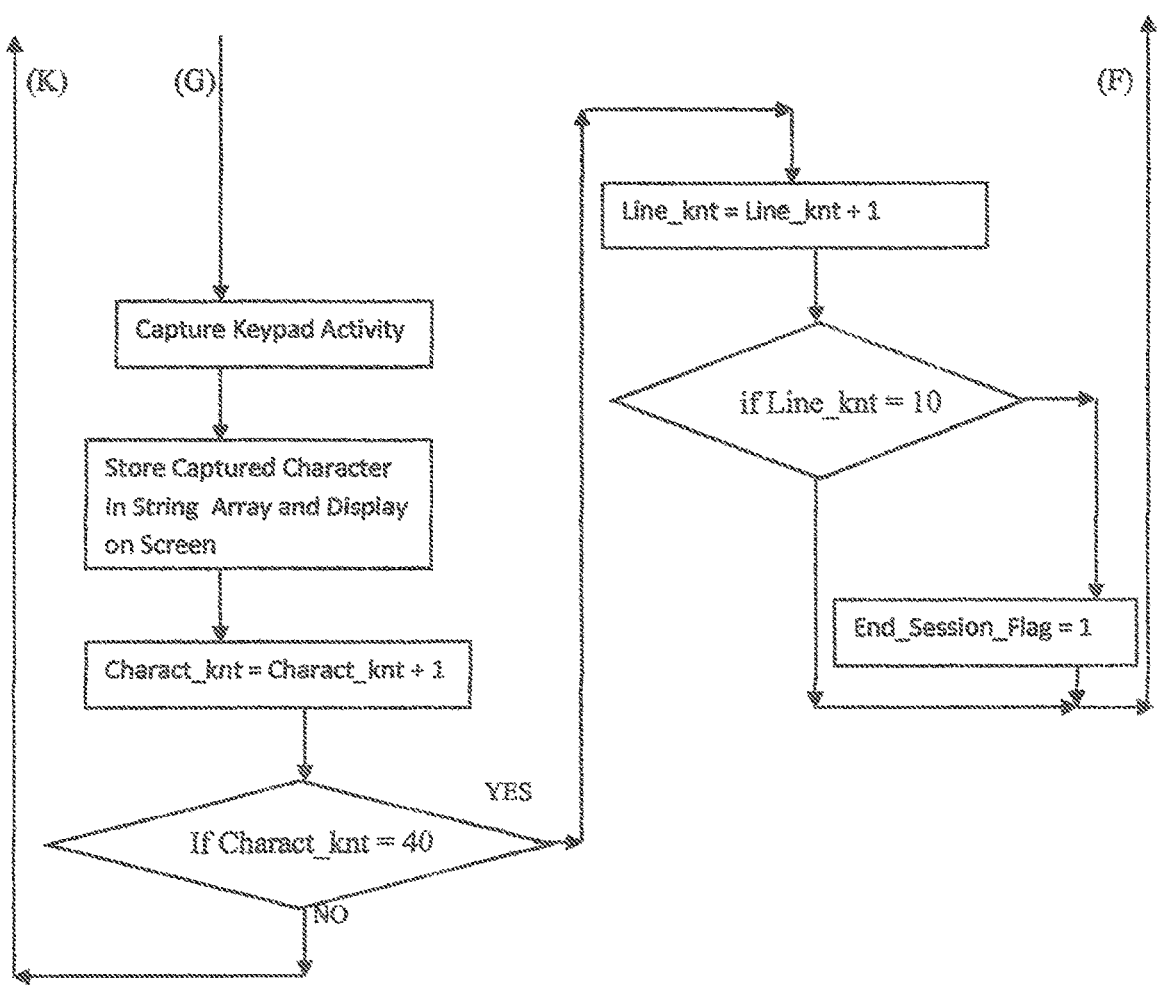

What is claimed:

1. A method, comprising: transmitting and receiving alphanumeric text characters between a plurality of mobile device via a communication network, storing the transmitted and received alphanumeric text in records in a searchable database file accessible to users of the transmitting and receiving mobile devices; wherein fields of the record are interactive with functionality of the mobile device, enabling the mobile device to trigger activities base on contents of specific fields; wherein the fields of the record are interactive with functionality of the mobile device, enabling the mobile device to trigger activities base on the contents of specific fields; and wherein the content of a field in one record can affect the operating system of mobile device, allowing the time relate field to trigger a notification alarm.

2. The method of claim 1, wherein the content of a field in one record can affect the contents of one or more fields in the same record, allowing a time relate field to trigger the removal of all outdated information in other fields of the record.

3. The method of claim 1, wherein the content of all the records in database can be search by a specific field to retrieve all records within the database with the same searched for item.

4. The method of claim 1, wherein alphanumeric information is exchanged between mobile devices while a voice conversation is in progress.

5. A method implemented within a mobile calling device for transmitting text messages while an ongoing voice phone call is being conducted between the call initiating party (CIP) and a call receiving party (CRP), the method comprising the steps of: when a call is initiated the CIP's phone will send an indicator flag to the CRP's phone, CIP detecting a counter flag from the CRP indicating its ability to transmit and receive information while the phone call is in progress, CIP detecting and decoding signals into alphanumeric characters to be displayed as a forwarded message from the CRP, CIP able to convert signal generated from pressing alphanumeric character on a keypad into signals that can be transmitted over a voice communication network to the CRP, CRP able to detect and decode signal forwarded from the CIP and display as message, CRP able to convert signal generated from the pressing alphanumeric character on a keypad into signals that can be transmitted over a voice communication network to the CIP, both CRP and CIP able to store the communicate message in a record in a database file, stored records can be searched and retrieve for viewing, any given record can trigger an action when a specific temporal event occurs.

6. The method of claim 5, wherein the database file holding records can be located on the mobile calling device, or can be located on the cloud and access by the mobile calling device.

7. The method of claim 6, wherein the content of all the records in database can be search by a specific field to retrieve all records within the database with the same searched for item.

8. The method of claim 6, wherein the mobile device able to store and retrieve records in database file from a cloud base computer system is also able to retrieve media files from a third party that is also stored on a cloud base computer system.

9. The method of claim 8, wherein the mobile device is able to display the retrieved media file as an ad on the mobile device for a set time period before removing it.

10. The method of claim 5, wherein a specific temporal event can be a set calendar date, a set time on a set date, or a number of days.

11. The method of claim 10, wherein the content of a field in one record can affect the contents of one or more fields in the same record, allowing the time relate field to trigger the removal of all outdated information in other fields of the record.

12. The method of claim 5, wherein a specific temporal event trigger an action in the mobile device to alert a user to a specific event.

13. The method of claim 12, wherein an alert can be an alarm related reminder of a task that is to be done such as an appointment.

14. A mobile device-implemented method comprising:
software for storing and retrieving text messages in a record format in searchable database files on remotely located central processing center computers, and have the mobile device able to access, download, and view third-party media files from the remotely located central processing center computers, wherein the third party media can be an image file that will be briefly displayed to the mobile device user.

15. The method of claim 14, wherein the third party media can be an image file that will be briefly displayed to the mobile device user.

16. The method of claim 14, wherein the software stored on the mobile device can search fields of the records in the database and interactive with them base on of the mobile device internal clock function, enabling the mobile device to trigger activities base on a time setting in a specific field.

17. The method of claim 16, wherein the content of a field in one record can affect the contents of one or more fields in the same record, allowing the time relate field to trigger the removal of all outdated information in other fields of the record.

18. The method of claim 14, wherein the content of all the records in database can be search by a specific field to retrieve all records within the database with the same.

* * * * *